United States Patent [19]
Krauss

[11] Patent Number: 6,154,943
[45] Date of Patent: *Dec. 5, 2000

[54] DEVICE FOR CLOSING SHEATHINGS SUCH AS CABLE CONDUITS

[76] Inventor: Erich Krauss, Fichtenstrasse 61, D-68535 Neckarhausen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,662

[22] PCT Filed: Jun. 19, 1995

[86] PCT No.: PCT/EP95/02368

§ 371 Date: Sep. 10, 1996

§ 102(e) Date: Sep. 10, 1996

[87] PCT Pub. No.: WO96/02967

PCT Pub. Date: Feb. 1, 1996

[30] Foreign Application Priority Data

Jul. 16, 1994 [DE] Germany ............................ 44 25 257
May 31, 1995 [DE] Germany ............................ 195 19 849

[51] Int. Cl.[7] .................................................. B23Q 17/00
[52] U.S. Cl. ..................................... 29/407.05; 29/243.56; 29/432.1; 29/525.07; 29/525.08; 29/525.15; 29/716; 227/13
[58] Field of Search ............................. 29/243.56, 432.1, 29/525.05, 525.07, 525.08, 525.09, 525.13, 525.15, 407.05, 716, 275, 276, 34 B; 227/12, 13

[56] References Cited

U.S. PATENT DOCUMENTS

| | | | |
|---|---|---|---|
| 2,666,916 | 1/1954 | Spiegel et al. | 227/12 |
| 3,650,009 | 3/1972 | Ausnit et al. | |
| 4,218,814 | 8/1980 | Hodapp | 29/525.05 X |
| 4,224,731 | 9/1980 | Lingle | 29/716 X |
| 4,891,256 | 1/1990 | Kite, III et al. | |
| 5,208,962 | 5/1993 | Walker, Jr. | 29/716 X |

FOREIGN PATENT DOCUMENTS 1046539  9/1956  Germany .

*Primary Examiner*—David P. Bryant
*Assistant Examiner*—Marc W. Butler
*Attorney, Agent, or Firm*—Pillsbury Madison & Sutro

[57] ABSTRACT

The invention relates to a device for closing sheathings, such as cable conduits 23, flexible pipe lines or container elements by means of a closure device 25 provided on a tool 24, wherein closure elements 26 at two oppositely located rim parts of the sheathing can be alternatingly hooked together and unhooked, or separated, when being opened by means of a slider 27 disposed on the tool 24. A further device 29 for securing the connected closure elements 26 or connecting elements, which can be respectively activated independently of the position of the slider 27, is provided on the tool 24 for receiving the slider 27.

25 Claims, 12 Drawing Sheets

DEVICE FOR CLOSING SHEATHINGS SUCH AS CABLE CONDUITS

BACKGROUND OF THE INVENTION

The invention relates to a device for closing sheathings, such as cable conduits, flexible pipe lines or container elements by means of a closure device provided on a tool, wherein closure elements at two oppositely located rim parts of the sheathing can be alternatingly hooked together and unhooked, or separated, when being opened by means of a slider disposed on the tool.

A tool for closing zippers is already generally known, which is used in connection with zippers of cable conduits and for this purpose has a slider, which connects the two oppositely located closure elements or takes them apart again, if this is desired. Closure elements put together in this way, however, are unsecured and can therefore easily be opened again, even if this is not intended, particularly if a pull is exerted on the closure elements.

A coil zipper made of plastic for closing slits in duvets or pillow covers is furthermore known (DE PS 10 46 539), wherein the connected end position can be locked against being ripped open after the slider has been received by the coupled closure by means of a removable connection clip which connects both support strips and can be inserted into them. The mounting of such a zipper for cable conduits is very time-consuming, because the closure element for the zipper with the associated slider can only be manually operated. Therefore a lot of time is needed to close cable conduits with such a slider. Since the cables inserted into the cable conduits exert a relatively strong pressure on the cable wall, a very great expenditure of force is required in addition, so that the closure mechanism can only be moved with great difficulties and in some cases not at all.

SUMMARY OF THE INVENTION

In contrast thereto, it is the object of the invention to embody and arrange the device for closing sheathings, such as cable conduits, in such a way that the closure elements can be easily and very quickly connected and also secured with a single tool.

This object is attained in accordance with the invention in that a further device for securing the connected closure elements or connection elements is provided on a tool for receiving the slider, which can be activated independently of the respective position of the slider. By means of the advantageous design and arrangement of the tool it is possible to easily connect the closure elements, for example a zipper, in a single pass and to secure them with the same tool, so that opening of the closure elements by pulling forces acting on the closure elements is not possible. It is possible by means of this to make the working process for closing zippers considerably less expensive.

To do this it is advantageous that the device for securing the connected closure elements is provided in the area of the slider. Since the device for securing the connected closure elements is provided relatively close to the slider, the automatic opening of the closure elements connected by the slider is prevented, if the securing element on the closure elements is used for this.

In accordance with a further development of the invention, an additional possibility consists in that the device for securing the connected closure elements or the zipper is provided in front of or behind the slider in respect to the direction of movement of the slider.

It is advantageous in a further embodiment of the invention that the device is formed by a plunger guided on the tool and an anvil or matrix cooperating with it, which can be activated by means of a regulating element. Clips, which secure the connected closure elements of the zipper against separation, can be inserted into the zipper in a very low-cost manner by means of the plunger and the anvil cooperating with the plunger.

In accordance with a preferred embodiment of the attainment of the object of the invention it is finally provided that the device for securing the connected closure element is formed by a plunger guided on the tool and an anvil or matrix cooperating with it, wherein the device can be activated by means of a regulating element which acts together with a sensor which triggers a regulating pulse after the tool has traveled a defined distance and causes a displacement of the plunger. It is possible by means of the employment of a sensor provided in the area of the plunger to automatically trigger a regulating pulse by means of the sensor.

It is of particular importance for the instant invention that the device for securing the connected closure elements of a zipper is in operative contact with a hydraulic, pneumatic or electric regulating device, which is in operative contact with the regulating element and/or the plunger. It is possible by means of the hydraulic or pneumatic or even electrical regulating device to optimally employ the device for securing the closure elements and also to activate it by means of an external sensor after the tool has traveled a defined distance and has arrived at a junction, for example, in whose area the zipper or the associated closure elements are to be secured. By means of this it is also possible to employ the device for securing automatically always at a time when a defined position on the zipper has been reached.

It is advantageous in connection with the embodiment and arrangement in accordance with the invention, that the device for securing the connected closure elements consists of a hydraulic or pneumatic regulating cylinder which is operatively connected with an actuating device of the plunger.

It is furthermore advantageous for a measuring device, which can be connected with a computer, to be assigned to the closure device and/or the device for securing the connected closure elements, and that the measuring device consists of a measuring wheel or a pulse sensor which detects a distance travelled by the tool and, at a defined point, forwards regulating information to a sensor, which causes a displacement of the plunger. By using a measuring device which in an advantageous manner is provided in the area of the closure device, it is possible in an advantageous manner to detect the distance between two defined points or connecting points of cable conduits in a cost-effective manner and to provide the possibility by this to automatically achieve the securing of two connected closure elements after a defined distance has been travelled or an appropriate junction was approached by the tool, so that in this case the sensor activates the closure device on the basis of an appropriate pulse.

It is advantageous for this purpose if the measuring device, the closure device and the device for securing the connected closure elements are combined in one component. By combining all components a single tool, an easily manipulated device is obtained, by means of which all important functions can be performed for providing cable conduits with sheathing and to secure them.

In this connection it is furthermore advantageous if the measuring device, the closure device and the device for securing the connected closure elements are combined in an electrical module, wherein the measuring device, the closure device and the device for securing the connected closure elements are in operative connection with an electrical control device.

In further embodiment of the invention it is advantageous that the computer is part of the control device, by means of whose control program stored in a data bank the device for securing the connected closure elements can be controlled as a function of a travelled distance of the tool, and that the tool is equipped with a device for registering various data via a cable set and is connected with a current supply source.

It is furthermore advantageous that the tool is equipped with an acoustical and/or optical indicator device or display. All cable sets which can be used in production can be registered by using a computer and can also be designed in accordance with the requests of the customers in such a way that they can be individually used for defined types of motor vehicles. A possibility to make all important information available to the operator of the tool has been created by this, so that all he has to do is pull the tool through the zipper for connecting the individual closure elements with each other and to secure them in the area of the junction of two connected cable conduits. It is therefore no longer necessary to perform elaborate measuring operations prior to using the working tool in order to insert the securing element at a desired location. The tool can be employed fully automatically because of the registration of all important data of a cable set, so the preparations which were customary up to now can be omitted. In particular, it is possible to omit the very elaborate layout and determination of individual junctions on a measuring or assembly table in the customary form since, as mentioned, the measuring work required up to now can be omitted.

In this respect it is advantageous that the tool has an unlocking device which can be controlled via sensors and unlocks the locking elements if a further branch is to be added to a produced cable bundle or is to be connected with the main cable branch and if the tool is equipped with several devices for securing the clips.

It is furthermore possible for the anvil to be provided with a curvature on its opposite ends, which is determined by the radius=R which is half the thickness=D of the anvil.

In a further development of the invention it is advantageous for the radius R to have a value between 1 and 50 mm. By means of the advantageous design of the individual closure elements, which can be embodied either as fitted elements or as tongue-and-groove elements, a highly tear-resistant conduit is obtained by means of the tool locking the individual closure element together, which cannot be opened further, even under great pressure stress. By means of the tool the closure elements can be locked together with a small expenditure of force in a very short time and, because of the employment of the measuring members, only enough cable conduit is enclosed as is required for a defined distance. Even if such cable conduits cannot always easily be closed because of the individual cables, the closing work is made considerably easier by the employed tool.

It is advantageous for this purpose that the sheathing created in accordance with this device or the cable conduit has, as closure elements, a zipper with meshing teeth or connectable tongue-and-groove elements or connecting elements, which rest on each other and can be glued or welded together, and that the fitted spring is embodied as a hook which can be inserted into the groove.

It is also possible to connect the connecting elements of the closure element located opposite each other by means of an adhesive and that the connecting elements of the closure element located opposite each other can be thermally connected with each other.

It is furthermore advantageous that the oppositely located connecting elements have surfaces which can be brought into contact with each other and to which the adhesive can be applied, and that the opposite located connecting elements have been treated on their oppositely located surfaces in such a way that they enter into a secure connection with each other.

In a further development of the invention it is advantageous that the sheathing has expansion elements for changing its cross section.

In this respect it is advantageous that first the closure elements are connected with each other by means of the tool and are secured connected with each other by means of a device for securing the connected closure elements, wherein it is possible to insert one, two or several closure elements into the cable conduit in the area of the cable junction, and that various dimensions of cable conduit arrangements and various branches or separate bundles and/or the distances between two junctions of cable conduit arrangements are stored in a data bank and can be made available to the control device of the tool.

An advantageous process is realized by means of the following process steps:

a. Entry of the key number of a defined car type in accordance with the request of the customer into the data bank, b. Selection of a cable set in accordance with the car type and request of the customer, c. Determination of a sequence of the vehicles to be assembled in a defined sequence 1 to n, d. Closure of the zipper by means of the tool, e. Determination of the distance between two junctions of the cable set, f. Securing the closure elements of the zipper by means of the device.

An advantageous process is also realized by means of the following process steps:

a. Entry of the key number of a defined car type in accordance with the request of the customer into the data bank, b. Selection of a cable set in accordance with the car type and request of the customer, c. Determination of a sequence of the vehicles to be assembled in a defined sequence 1 to n, d. Preparation of a drawing of the cable set and showing it on a display, e. Closure of the zipper by means of the tool, f. Determination of the distance between two junctions of the cable set, g. Securing the closure elements of the zipper by means of the device.

It is furthermore advantageous that the information regarding a cable set for a defined car type stored in the data bank is processed graphically and is made visible on a screen and/or printed out as a drawing and, after the entry of a defined numerical characteristic of a car type along with the determination of the individual distances between two junctions, is processed graphically and made available to production planning.

It is advantageous in addition that, in the area of a junction ahead of and/or behind the junction and/or in the area of a closure element, the closure elements are locked together by means of the tool are secured by a fastening element or a clip which are inserted by means of the device between respectively two oppositely located closure elements.

Further advantages and details of the invention are explained in the claims and in the description and represented in the drawings, wherein it should be noted that all individual characteristics and all combinations of individual characteristics are essential for the invention. Shown are in:

DETAILED DESCRIPTION OF THE INVENTION

Figure 1:
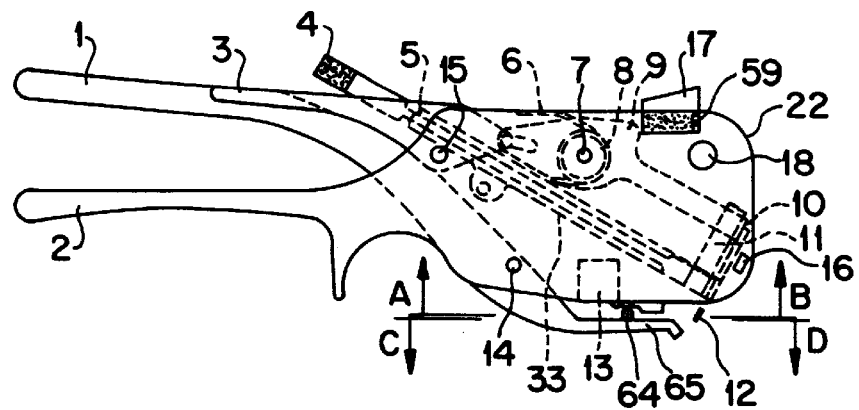
FIG. 1, a schematic representation of the tool with a closure device and a device for securing the connected closure elements by means of a trigger, FIG. 2, a top view in accordance with FIG. 1, FIG. 3, a sectional representation along the line C–D in accordance with FIG. 1, FIG. 4, a sectional representation along the line A–B in accordance with FIG. 1, FIGS. 5a and 5b, a partial view of a zipper with the associated slider for locking the individual closure elements, FIG. 6, a further exemplary embodiment of a tool with a pneumatic regulating device, FIG. 7, various cables arranged in a cable set and enclosed by means of a cable conduit, FIGS. 8 and 9, two different functional sequences for producing a cable set as well as its sheathing, FIG. 10, a device for securing the connected closure elements with a cable conduit in a sectional view prior to the employment of the associated plunger, FIG. 11, a fastening element or clip, which was inserted into the zipper by means of the plunger of the device for securing the connected closure elements, FIG. 12, a perspective representation of the tool for closing sheathings or cable conduits such a flexible pipe lines or container elements with two movable tool elements disposed opposite each other, which connect the closure elements, FIG. 13, representation of a cable conduit similar to FIG. 14, wherein an adhesive material has been applied only in the upper space, FIG. 14, a further exemplary embodiment of a cable conduit with closure elements which are connected and into whose hollow spaces an adhesive material can be inserted, FIG. 15, a further working tool with a welding transformer, FIG. 16, a further working tool with a tank for an adhesive.
Figure 2:
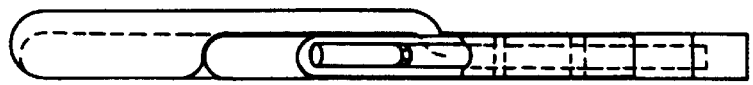

In the drawings a tool is indicated by 24, which is used as a device for closing sheathings, such as cable conduits 23, flexible pipe lines or container elements.

The tool 24 consists of a stationary handle 1 and a handle 2, hingedly connected with the handle 1, which is pivotably connected with the handle 1 by means of a joint bolt 15. The handle 1 has a housing element 22 for receiving a display 17 for showing drawn elements or data information, a device 29 for securing connected closure elements 26 of a zipper 57 represented in FIG. 5. Furthermore, a magazine 33 is provided in the housing element 22 for receiving the closure elements 26. The magazine 33 is a component of the device for securing the connected closure elements 26. The individual closure elements or clips 26 received in the magazine 33 are pushed in the direction of the outlet opening of the device 29 by means of a pressure device 4 and a spring, not represented in the drawings. The device 29, which can also be called a tacking device, is received in the housing element 22 via a joint bolt 7 and is pivotable against the action of a spring 6 between an initial and a working position. The handle 2 furthermore has a regulating element 58 which is operatively connected with a trigger device 55, so that when the regulating element 58 is operated, the device 29 for securing the connected closure elements 26 is actuated and by means of this fastening elements or clips 62 are inserted into the zipper 57 by means of an anvil or plunger 54 in accordance with FIG. 10 and a matrix 10 cooperating with the plunger, so that the already connected closure elements 26 can be secured against being undone.

Figure 11:
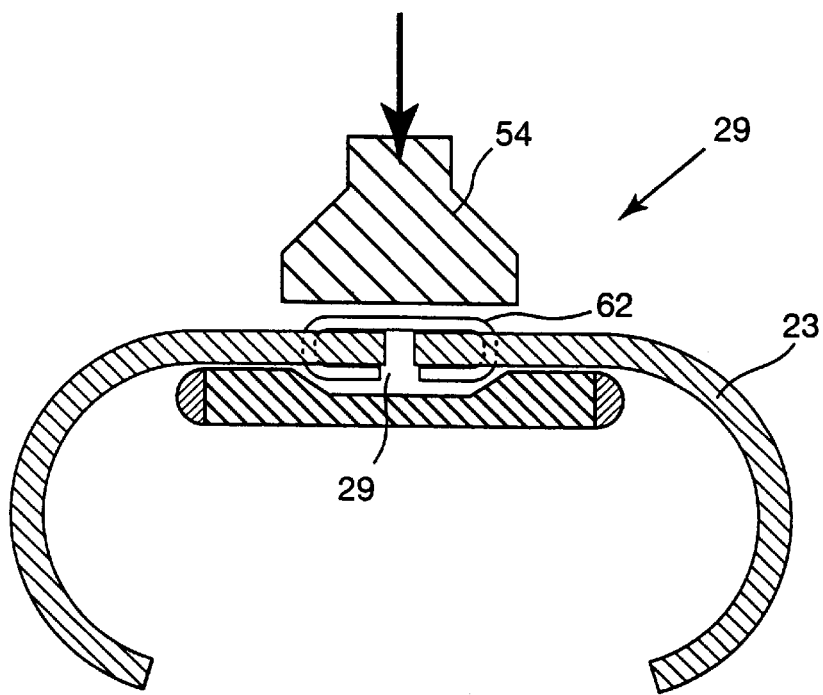

The fastening elements 62 can consist of clips embodied in a U-shape, which are pressed with their respective two legs at the back of the closure elements into the cable conduit 23 and are then bent at an angle by means of the anvil or matrix 10 in accordance with FIG. 11. On both its opposite ends the anvil can be provided with a curvature, wherein the curvature is determined by the radius=R which is half the thickness=D of the anvil, in order to protect the cable conduit 23 against damage. The radius R should have a value at least between 5 and 50 mm.

Figure 3:
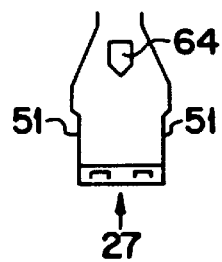
Figure 4:
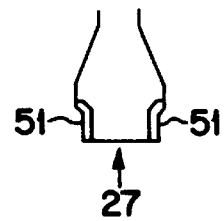
Figure 5A:
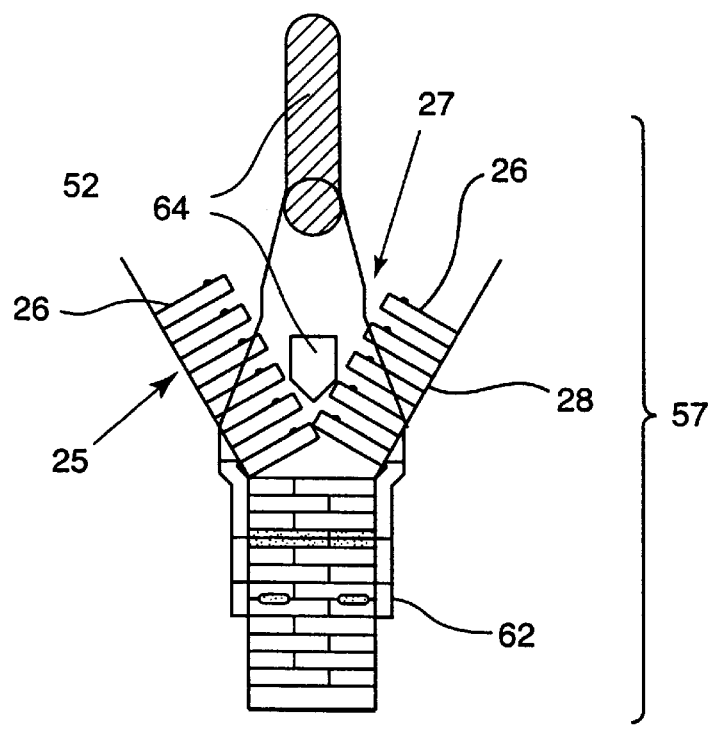
Figure 5B:
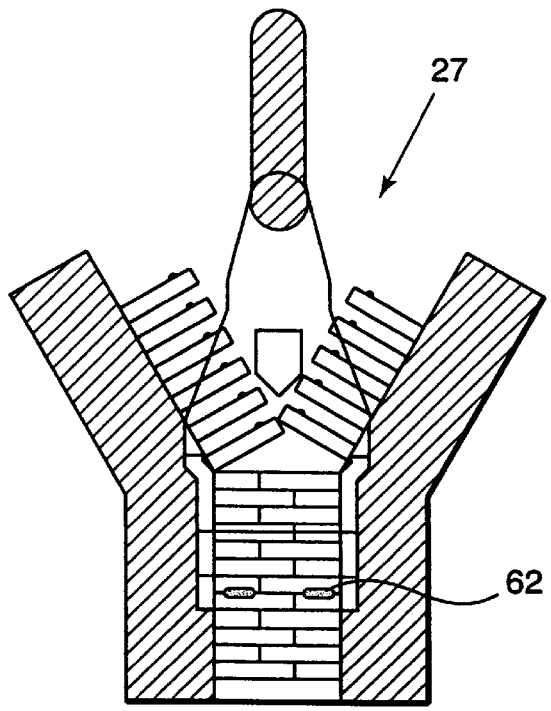

As can be seen in FIG. 1, a slider 27 is provided at the underside of the housing element 22 in accordance with FIGS. 3 and 4, which is formed of two oppositely located walls 51 and consists of a corresponding center part, by means of which the connected closure elements 26 can be disengaged again if the slider 27 in accordance with FIG. 5 is moved downward. If the slider 27 in accordance with FIG. 5 is moved upward, the closure elements 26 located opposite each other are hooked together.

In accordance with FIG. 1, following a tacking operation the device 29 is returned into the position in accordance with FIG. 1 by means of the restoring spring 6 and remains in this position until the regulating element 58 is actuated. For this purpose the device 29 is pivotably received in the housing element 22 via the joint bolt 7. The device 29 is furthermore in operative connection with the regulating element 58 via a joint bolt 63. If, for example, it is intended to connect the closure elements 26 of the zipper 57 in accordance with FIG. 5, the slider 27 is moved upward. For this purpose a spreading tongue 64 as well as the walls 51 of the slider 27 which is fixedly arranged on the handle 1 move through the zipper 57, so that the oppositely located walls 51 of the slider 27 connect and hook together the respectively oppositely located closure elements 26. If, for example, the slider 27 of a cable set has reached one the junctions represented in accordance with FIG. 7 between 100 and 103, or the closure end 104, the regulating element 58 is operated and the device 29 is actuated thereby and the respective closure element 26 is inserted in the cable conduit 23.

In an advantageous manner the plunger 54 of the device 29 is located closely ahead of or behind the slider 27 or the associated spreading tongue 64 for opening the closure elements 26. As already mentioned, it is possible by means of the spreading tongue 64 to disengage the closure elements 26 again if the slider 27 in accordance with FIG. 5 is displaced downward.

Figure 6:
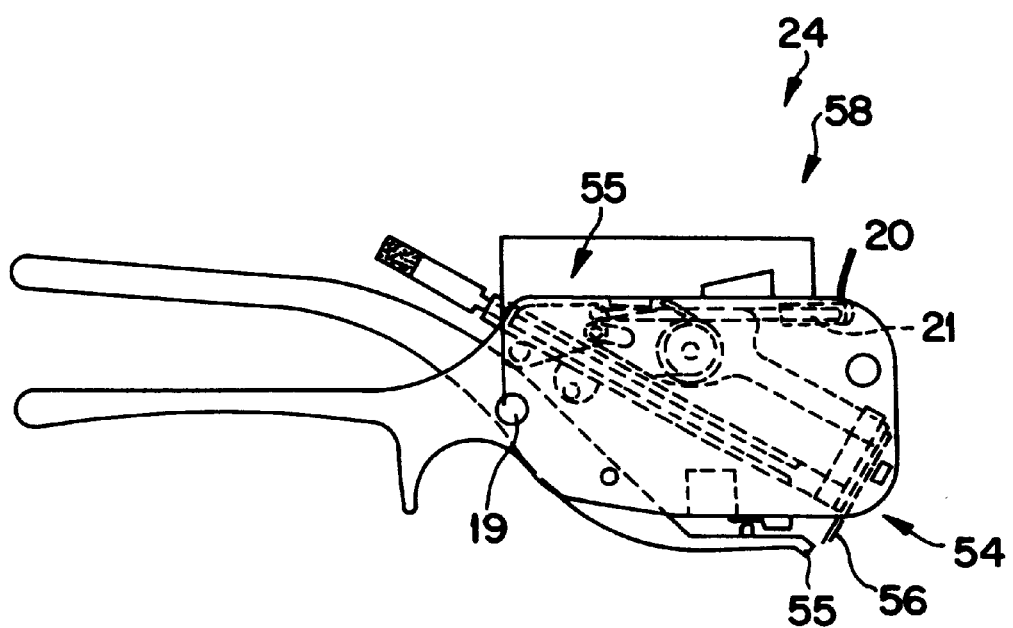
Figure 10:
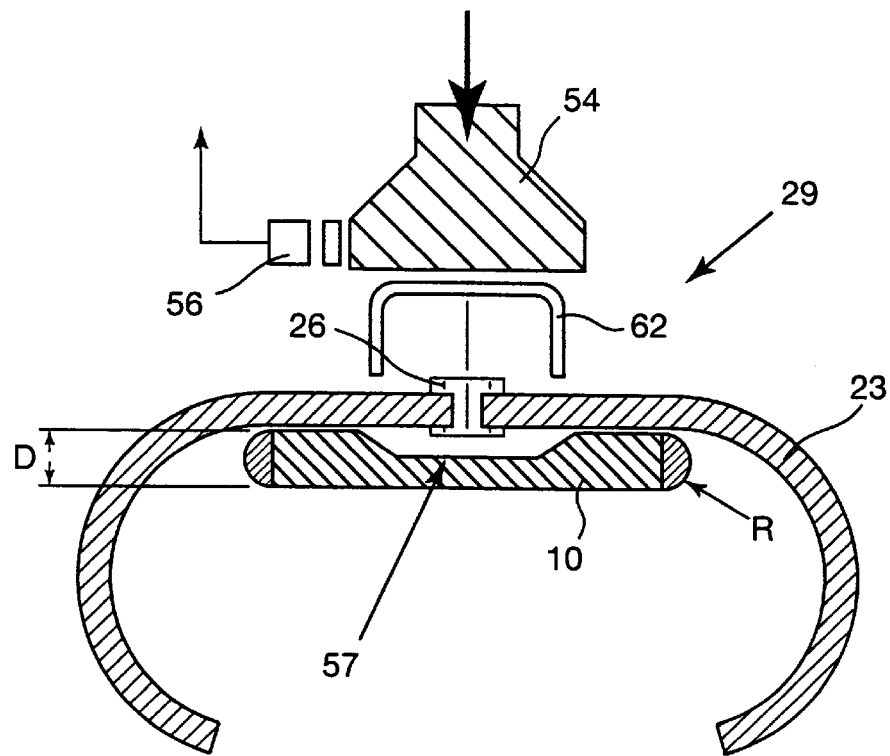

In accordance with FIG. 6, the tool 24 or the device 29 for securing the connected closure elements 26 of the zipper 57 can be in operative connection with an electric, hydraulic or pneumatic regulating device or a regulating cylinder 21. Thus, if the device 29 is to be actuated, the regulating cylinder 21 is charged with compressed air for this, so that the pneumatic regulating cylinder with the associated trigger device is actuated and the plunger 54 in accordance with FIG. 10 is moved downward and by means of this the fastening elements or the clips 62 are pressed into the cable conduit. It is furthermore possible that an electrically or optically reacting sensor 56 (FIG. 10) is associated with the regulating cylinder or even the plunger 54, which triggers a regulating pulse after the tool 24 has travelled a defined distance, for example when the junction position 101 has been reached and a displacement of the plunger 54 is caused by this.

Figure 8:
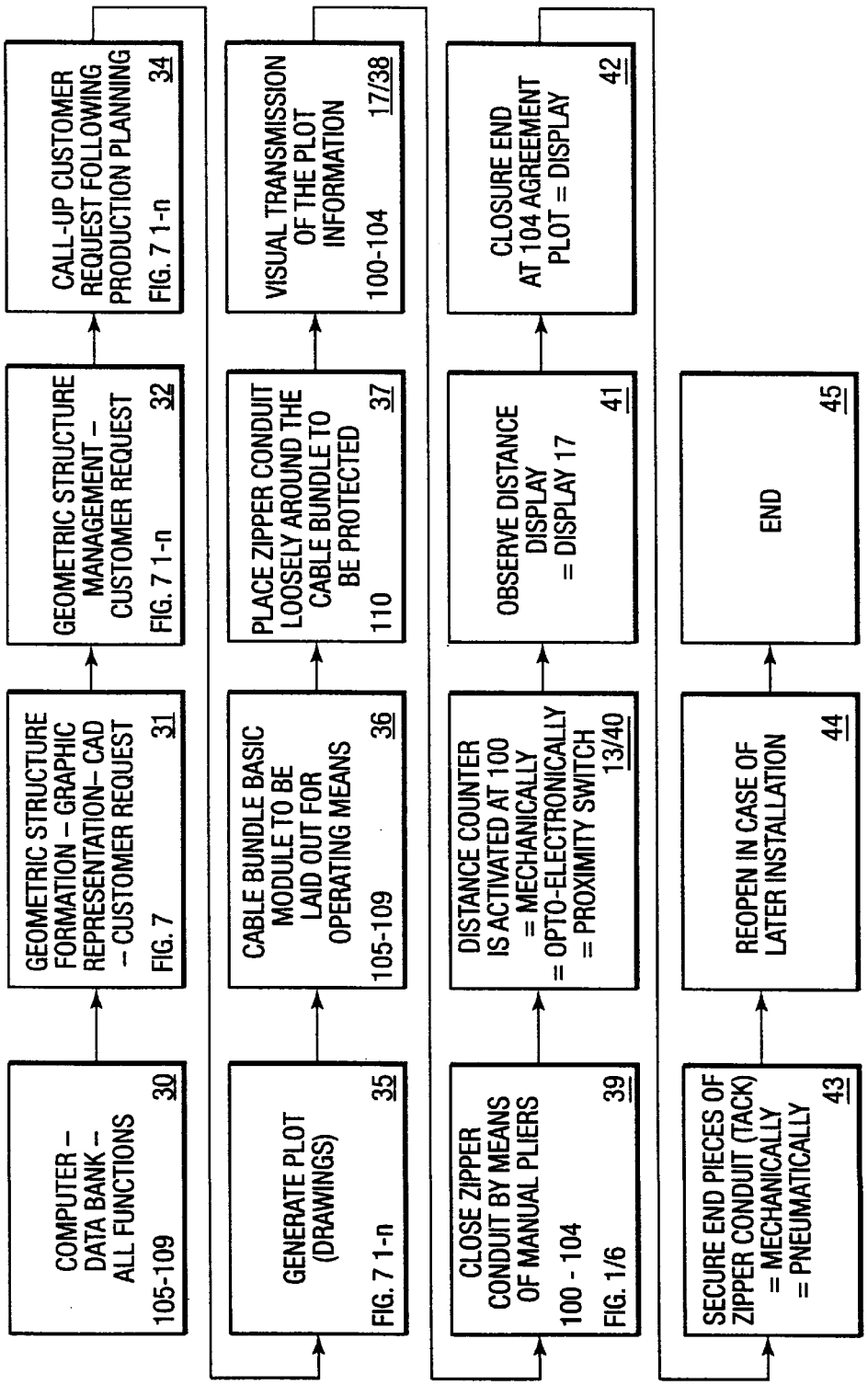

It is also advantageous that a measuring device 13 (FIG. 1) or, in accordance with FIG. 8, a distance counter 40 is associated with the device 29 for securing the connected closure elements 26, which detects the exact distance between two junctions 101 and 102 or 102 and 103 and, after having detected these junctions, triggers a regulating pulse via the sensor 56 at the respective time when a defined distance has been traveled or the sensor 56 has reached or passed the junction 103. Thus, the triggering process of a closure device 25 or of the device 29 can always be addressed after a defined distance has been traveled or, as already mentioned, the sensor 56 passes a corresponding junction 102 or 103.

It is particularly advantageous in connection with this that the tool 24 is equipped with a device for registering various data by means of a cable set 61 which is supplied with energy via a current supply device 18. In place of the display 17 represented in FIG. 1, it is also possible to provide an optical warning device or a diode on the tool 24, which reacts after a defined distance has been traveled or one of the junctions 101 or 102 or 103 has been passed.

A further improvement of the tool 24 is also achieved in that various dimensions of cable conduit arrangements 60 and the various branches or separate bundles or distances are registered, so that it is possible on the basis of these data to produce a cable set with its individual branches for a defined vehicle type. This cable set 61 then can also be made visible on a screen or printed out via a printer. By means of the registration in accordance with the invention of all data relevant to the cable, it is then possible to produce different cable sets 61 which, in accordance with the requests of a customer, can be made accessible to the operator and the tool 24 for a defined vehicle type in the form of a print-out.

Figure 7:
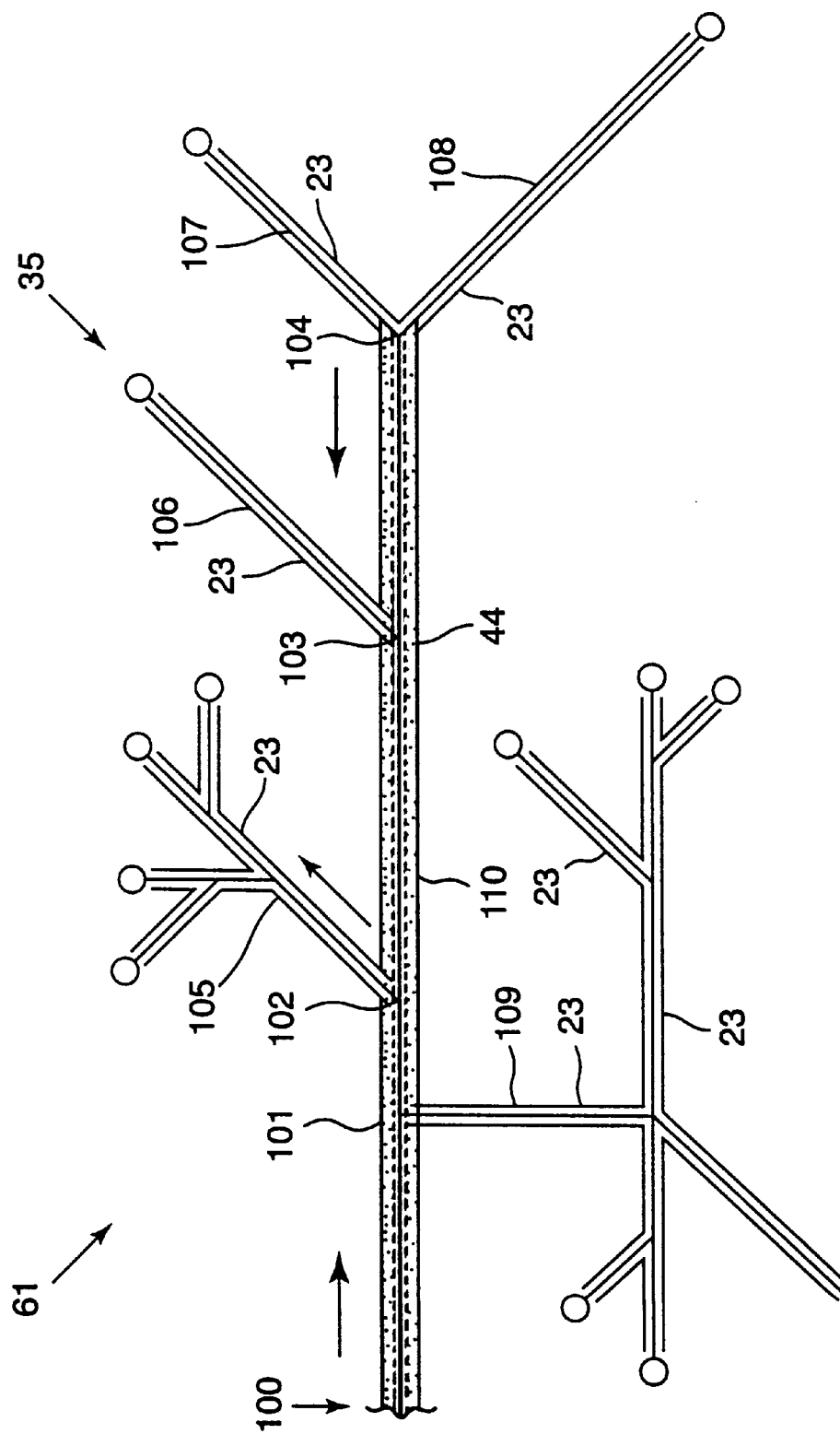

The already mentioned cable set 61 is represented in FIG. 7, which can consist of a main cable bundle 110 with a plurality of branched-off cable bundles 105, 106, 107, 108 and 109, which will be called cable branches hereinafter. In accordance with FIG. 7, the individual cable branches 105 to 109 are preassembled and each covered with a cable conduit 23. Up to now, the preassembled cable branches were placed on an assembly table provided with marker elements and then, after extensive measuring work, connected with the main cable bundle 110. After these assembly preparations had been performed, the main cable bundle 110 had to be provided with the cable conduit 23. The tool 24 was used for this. Because of the design in accordance with the invention of the tool 24 it is now no longer necessary to measure the cable bundle in the manner described, to assemble or finish it.

Figure 9:
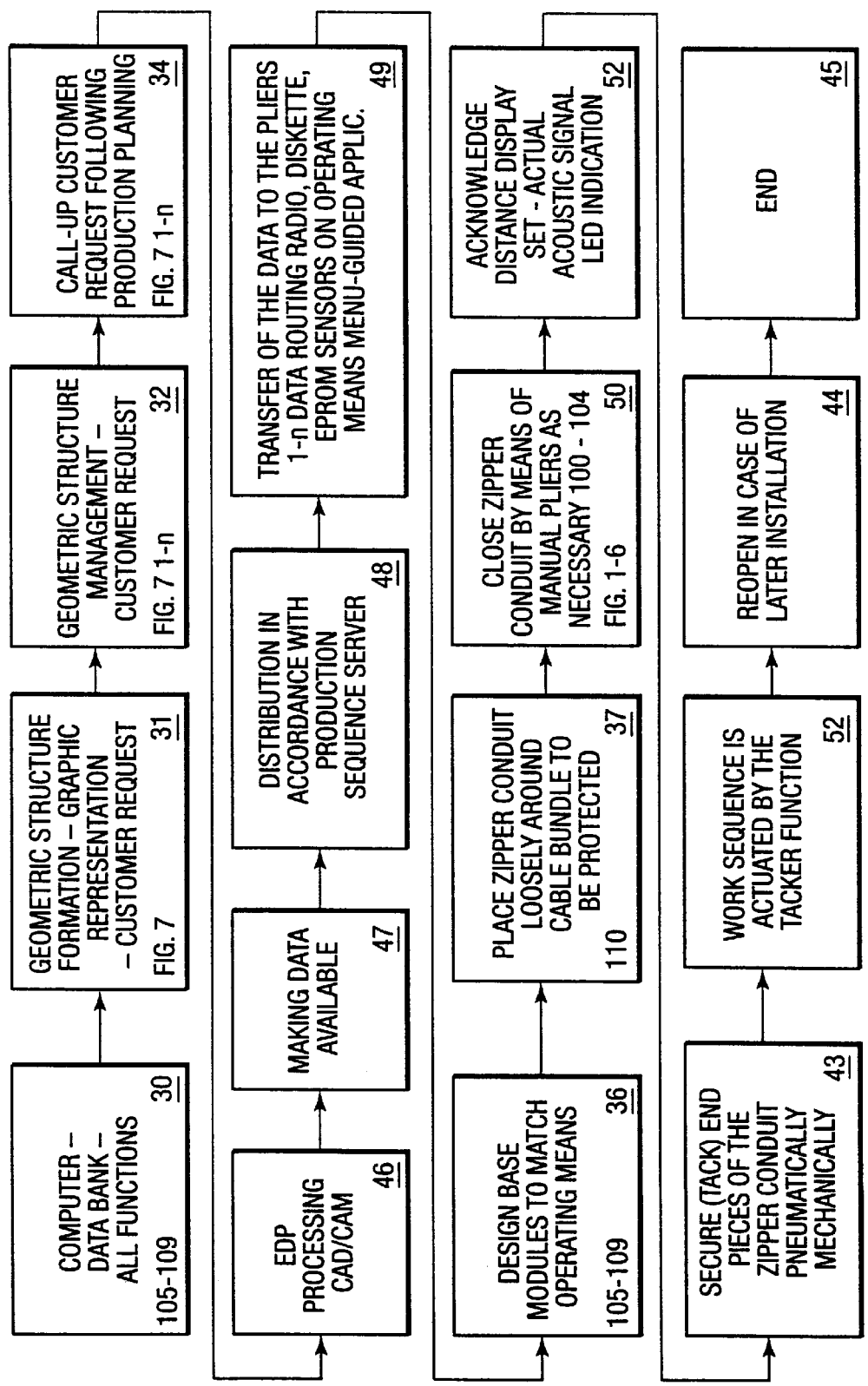

The assembly sequence or the production of the cable set 61 ensues from the two functional representations in accordance with FIGS. 8 and 9. First, all functions of or criteria for a cable bundle for the vehicles to be produced are registered in a data bank 30, for example, which cable bundles are to be connected to the generator, to the tail light, to the steering or the control hydraulics or to the airbag is entered into the data bank 30. Each motor vehicle can have numerous functional groups, which are connected via the individual cable bundles with the current supply 18 and the control or regulating devices. If such data or information regarding the cable set 61 has been registered, they can be displayed as a structural diagram in accordance with a graphic processing device 31. After learning the requests 32 of the customer, the appropriate cable set is called up and inserted into a production planning device 34. It is now possible, based on the recognized functions and the requests of the customers, to represent a very special cable set in a drawing in accordance with the diagram 35 and to fix a cable set 61 or a main cable bundle 110 in detail as the base module 36. Once the cable set 31 has been determined, the main cable bundle 110 can be provided with the cable conduit 23. For this purpose the tool 24 is inserted into the cable conduit 23 and connects the individual closure elements 26. To do this, the tool 24 moves along the main cable bundle 110 until it reaches a respective junction, for example 101. Since the tool is equipped with a sensor 56 and the measuring device 13, after a defined distance has been traveled the operator is informed either visually or acoustically by means of an indicator device, for example the display 17 and can then connect the first cable bundle 105 with the main cable bundle 110, or move it out of the conduit, if up to now the cable bundle 105 had been placed to run parallel with the main cable bundle 110. In accordance with the graphic representation (in accordance with FIG. 8 at 39), the clip 62 is inserted into the cable conduit 23 in the area of the junction 101 by means of the tool 24 and the device 29 for securing the connected closure elements 26, so that after this work step the closure elements 26 can no longer be separated. In an advantageous manner such a securing element or a clip 62 is inserted ahead of and after the junction 101. If later on such clips 62 are to be released again, they can be removed again, without the cable conduit 23 being damaged in the process, by means of a lifting device, not shown in the drawings, which can be provided on the tool 24.

After having performed the above described work processes, the tool 24 continues to be conducted through the cable conduit 23, and the operator receives further information via the display 17 or, in accordance with FIG. 8, via a distance indicator 41, in order to perform the same work processes as at the junction 101.

Once the operator has reached a closure end 42 or the junctions 100 to 103 with the tool 24, he is informed accordingly and now can also terminate the work process and secure the end pieces 43 of the cable conduit 23.

If, for example (position 43), a work process or a tacking process has inadvertently been performed wrong at a place of the work positions represented in FIG. 9, the error can be corrected or reversed by an appropriate process step and the work process can be repeated without the entire work sequence in accordance with the process of the invention being hindered.

In case a subsequent installation (see opening 44 in accordance with FIG. 8) of a cable bundle, for example 106, becomes necessary, the cable conduit can be opened again by means of the tool 24 and, in order to then connect the cable bundle 106 with the main cable bundle 110, the appropriate clips 62 can be removed. At the end of all work the termination of all work processes is shown on the display 17, so that the operator knows that the cable set 61 is finished.

In accordance with FIG. 9 it is possible to further improve the work sequence for producing a cable set 61. If in accordance with FIG. 8 all data of a cable set are appropriately registered, they can be processed by means of a CAD installation 46 and made available at 47 in accordance with FIG. 9 in order to fix in this way the production sequence (server) 48 of the individual cable sets 61. The transfer of the data 49 from the server 48 to the tool 24 can be performed via radio, diskette or EPROM. Optimum control of the tool 24 is obtained in this way for producing a cable set 61. The individual pieces of information can be read off the display 17 by the operator (see close info 50 in accordance with FIG. 8). After a defined distance has been traveled, the operator is informed accordingly by means of the display 17 (in accordance with the distance indicator 52 in FIG. 9) through an acoustic signal or an LED indication what should be done or whether further securing of the zipper 57 is to be performed or that in accordance with 45 all work for producing the cable set 61 has been performed (see end 45 in accordance with FIG. 8). All work processes not mentioned for producing a cable set 61 have been mentioned in the description of FIG. 8.

Figure 13:
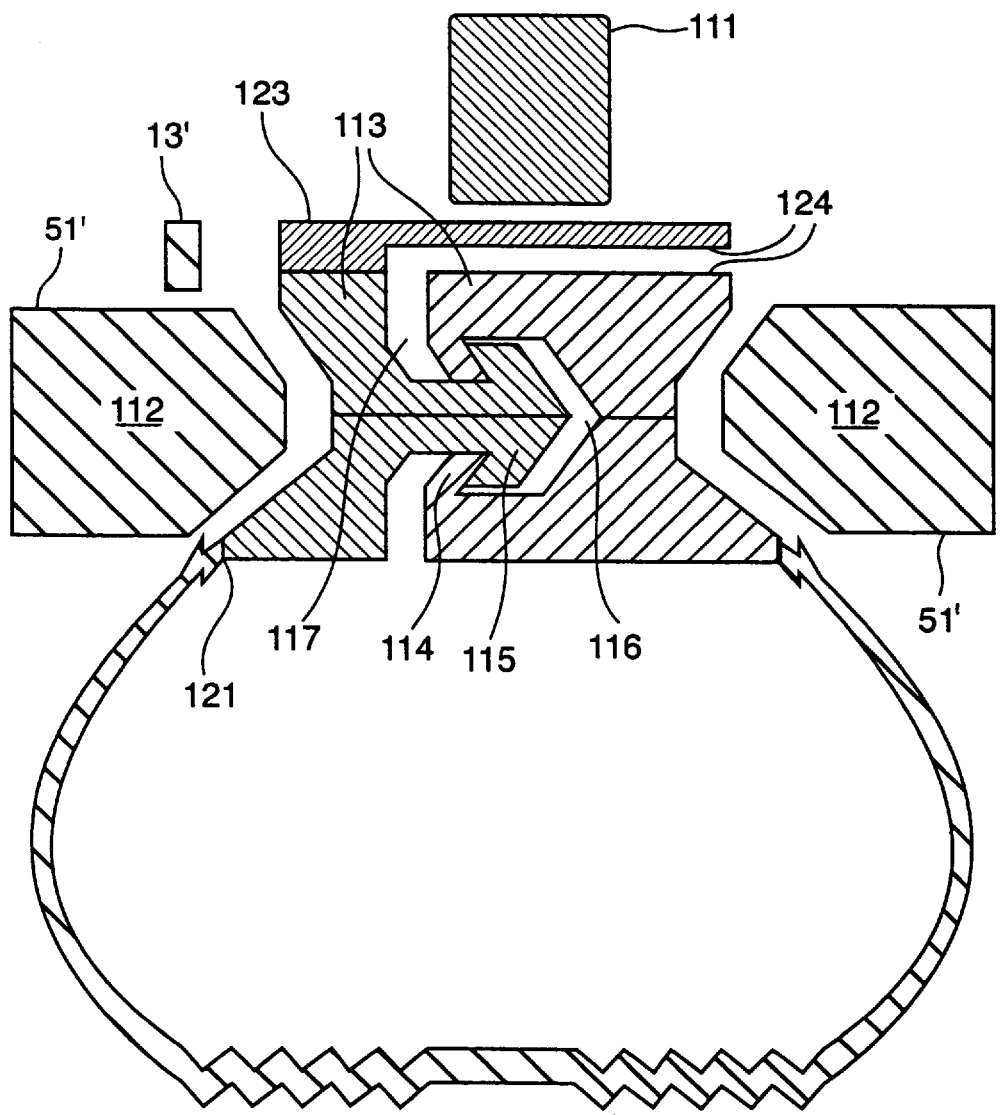
Figure 14:
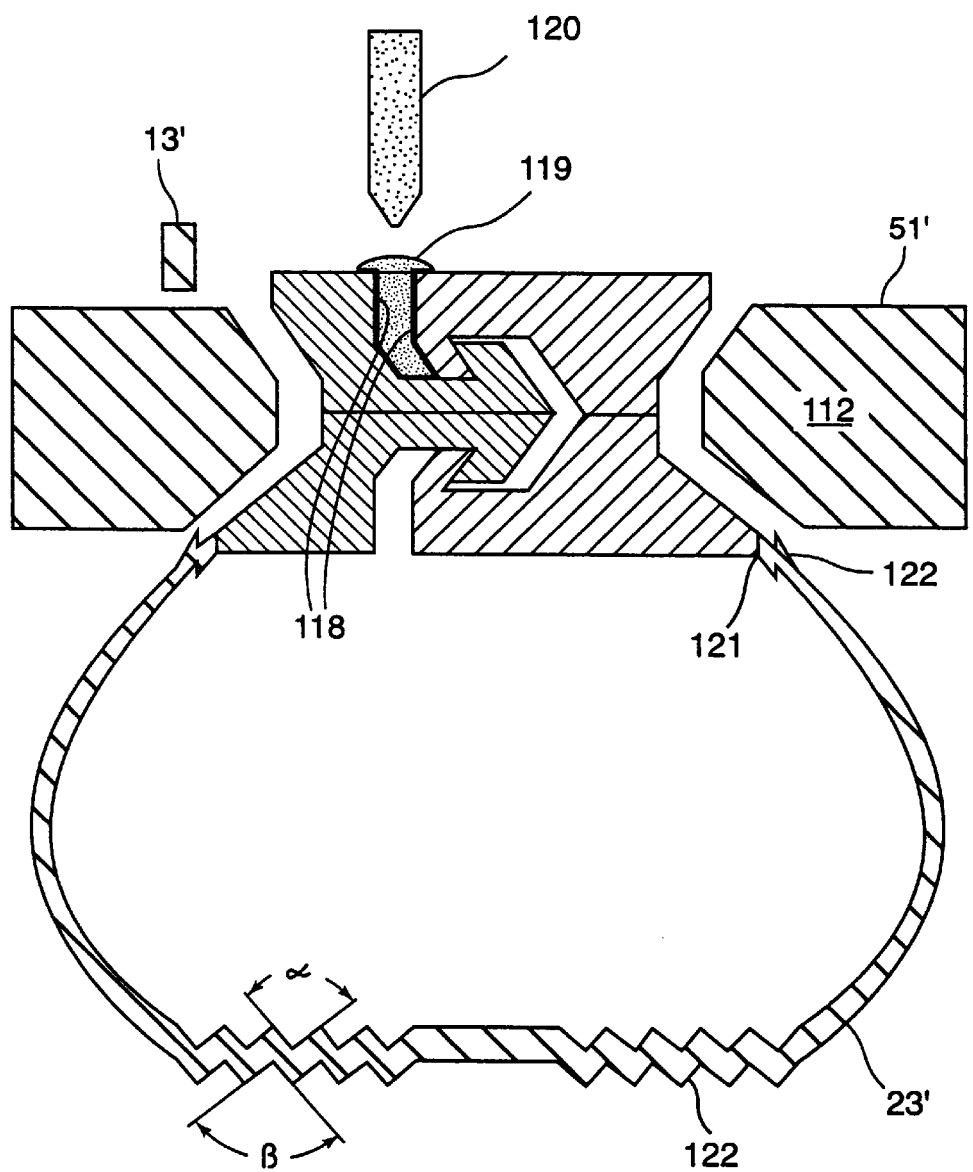

The cable conduit or the sheathing represented in FIG. 14 is used for receiving elements, for example cables, electrical elements or other electrical elements, which are intended to be protected from moisture or water spray. In accordance with FIGS. 13 and 14, the sheathing or the cable conduit 23' can consist of two lateral walls arch-shaped toward the outside, which are connected by means of a wall element which, making reference to FIGS. 13 and 14, extends horizontally. An expansion element 122 is located in the laterally opposed wall elements of the sheathing 23' or in the horizontally extending wall element, so that the cross section can be changed under excessively strong pressure when receiving the cable elements, and in this way better adapts to the outer contours of the individual cable elements. For example, the extension element 122 can be embodied in an accordion shape. However, it is also possible to form the expansion element in a Z-shape in a defined area, so that under increased pressure this area expands until a one-piece, non-folded wall is formed.

In place of the cable conduit and the expansion element represented there, it is also possible for the cable conduit itself to be made of an expandable material which adapts itself to the outer contours of the elements disposed in the cable conduit.

In accordance with FIG. 13, the two opposite wall elements are fixedly connected by their respective ends 121 to two oppositely located closure elements 113. In this case the end of the wall element 121 can be fixedly connected via a thermal connection or an adhesive connection with the closure element 113.

In accordance with FIG. 13 the two connectable closure elements 113 consist of a fitted element or a hook-shaped spring element 115 which is inserted into a corresponding groove 116, matched to the contour of the spring element, when by means of respective slide elements 112 the tool 24 is pressed against the back of the two oppositely located closure elements 113. For this purpose, the back 113 can be embodied to be approximately V-shaped, into which the slide elements 112 are pushed and which then move along the outer contour of the slide elements 112, so that in this work process the closure elements 113 are fitted into each other and in this way provide a solid connection with each other.

A tongue 123 is located above the connected closure elements 133 and is fixedly connected, at least at the start of work, to a closure element, the left closure element 113 in accordance with FIG. 3. The tongue 123 extends over the entire upper surface of the two connected closure elements 113, and in the process covers a groove or a space 117 formed between the surfaces 118. The connected, oppositely disposed adhesive surfaces 118 have a distance from each other, so that an adhesive material 119 can be inserted into this space or this groove 117. In accordance with FIG. 14, this adhesive material 119 is introduced by means of an injection tool. Only the spray nozzle of the injection tool, which is not further shown, is represented in FIG. 14. The adhesive material 119 is inserted into the upper groove 117 and thus sealingly closes the interior of the cable conduit 23', so that no water spray or moisture can enter into the interior of the cable conduit 23'. If the cable conduit is to be absolutely water-proof, it is necessary to design the wall of the cable conduit appropriately, so that it can withstand a corresponding pressure.

In place of the adhesive material 119 represented in FIG. 14, it is also possible for only the tongue 123 to provide a solid and sealed connection between the two closure elements 113. For example, the tongue 123 can be connected by means of an adhesive material with the welding surface 124 of the right closure element 113. However, it is also possible to sealingly connect the tongue 123 with the welding surface 124 by means of an ultra welding process. An appropriate welding tool 111, only schematically indicated in FIG. 13, is employed for this, which produces an ultra welding connection between the adhesive surfaces.

In place of an ultra welding connection, a thermal connection between the individual adhesive surfaces of the closure elements 113 is also possible. To this end the surfaces of the corresponding elements are heated until an adhesive connection between the individual elements to be connected is made. It is therefore also possible to embody the tool 111 as a heating element which heats the appropriate places until the desired adhesive connection between the elements to be connected has been made.

In FIG. 13 the walls 112 of the slider 51' are embodied to be V-shaped. However, it is also possible to embody the walls with a crown, wherein the corresponding counter-elements of the walls of the closure element 113 have an appropriately matched contour.

In accordance with FIG. 14, the expansion element 122 extends in a zig-zag fashion with appropriate recesses having an angle α or β, which can be between 45° and 110° or in an advantageous manner between 50° and 95°.

In the exemplary embodiment in accordance with FIG. 14, four recesses arranged behind each other are represented by the zig-zag shaped course of the expansion element 122. Depending on the size of the cross section, it is also possible to extend the expansion element, which then has a correspondingly greater number of recesses.

The expansion element 122 provided in the lower wall element can also be integrated into the lateral parts of the wall elements of the sheathing. The sheathing, which is advantageously formed by this, or the cable conduit 23' with the easily connectable closure elements, can be assembled very exactly in a short time with the aid of the appropriate element without a great expenditure of force.

If, for example, the cable conduit 23, 23' is to be opened again, it is only necessary to remove the individual closure elements or the adhesive connection and then to separate the closure elements. Opening of the cable conduit 23 can be performed particularly easily if no adhesive connection, but only a connection which can be plugged or connected together is selected.

Figure 12:
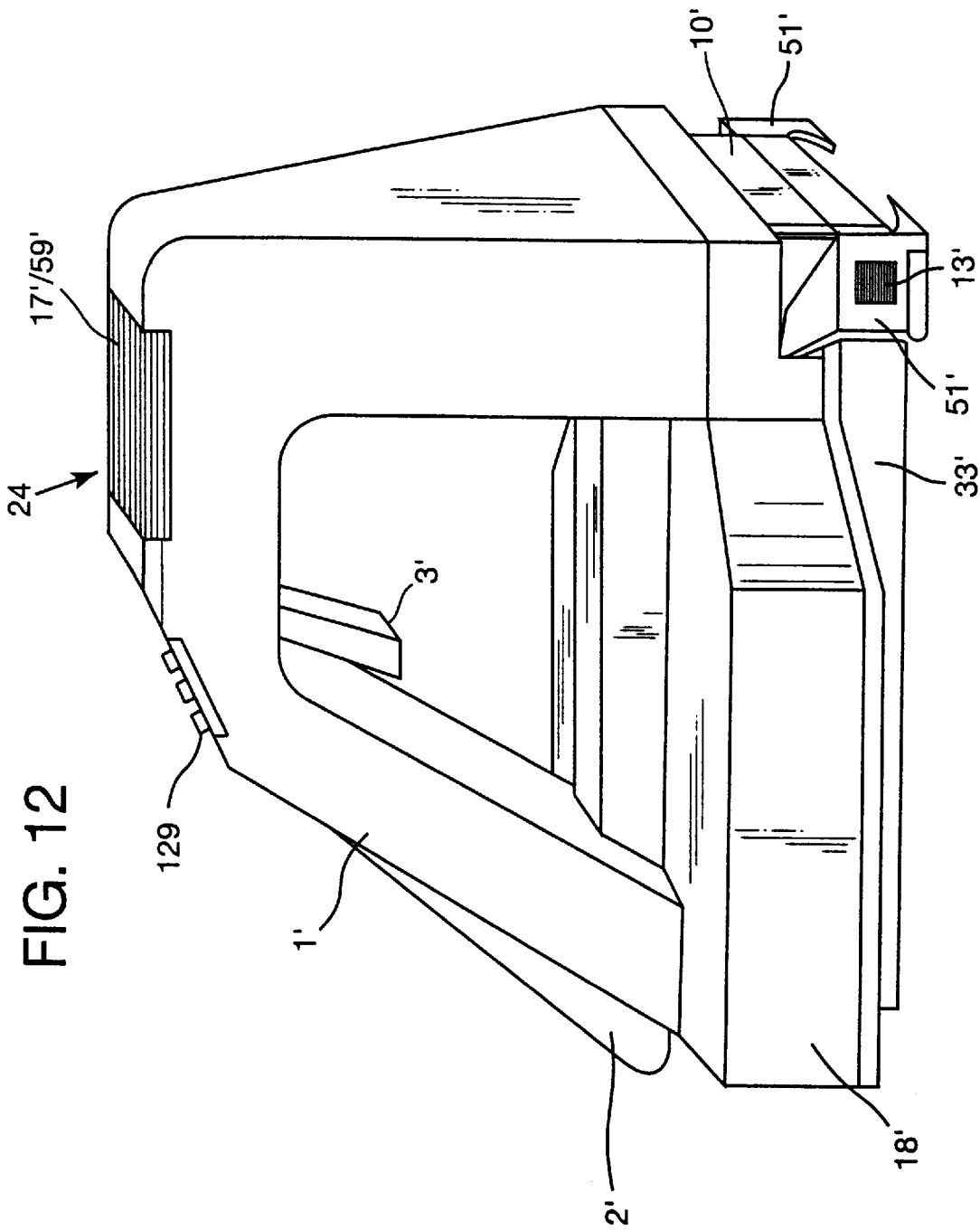
Figure 15:
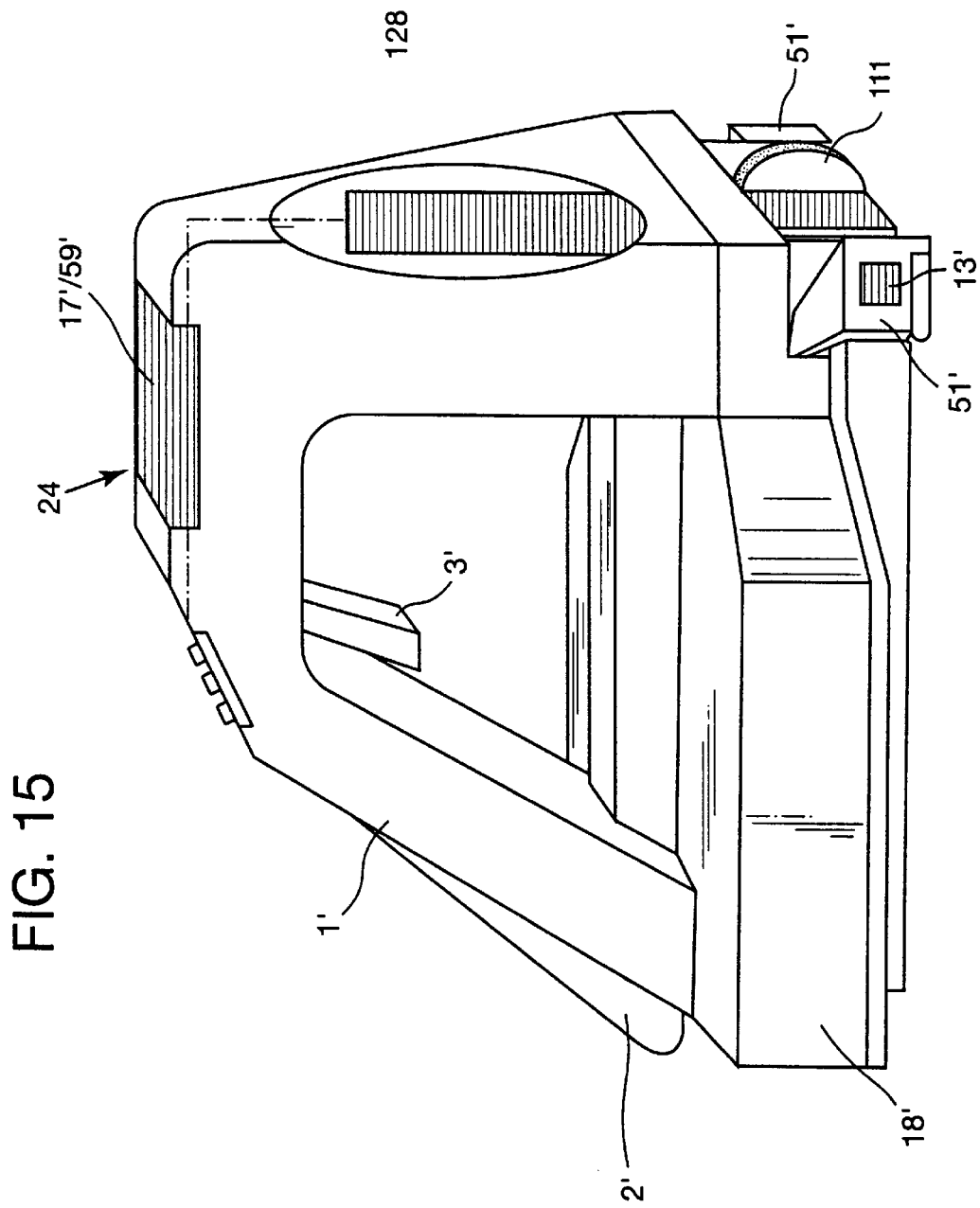
Figure 16:
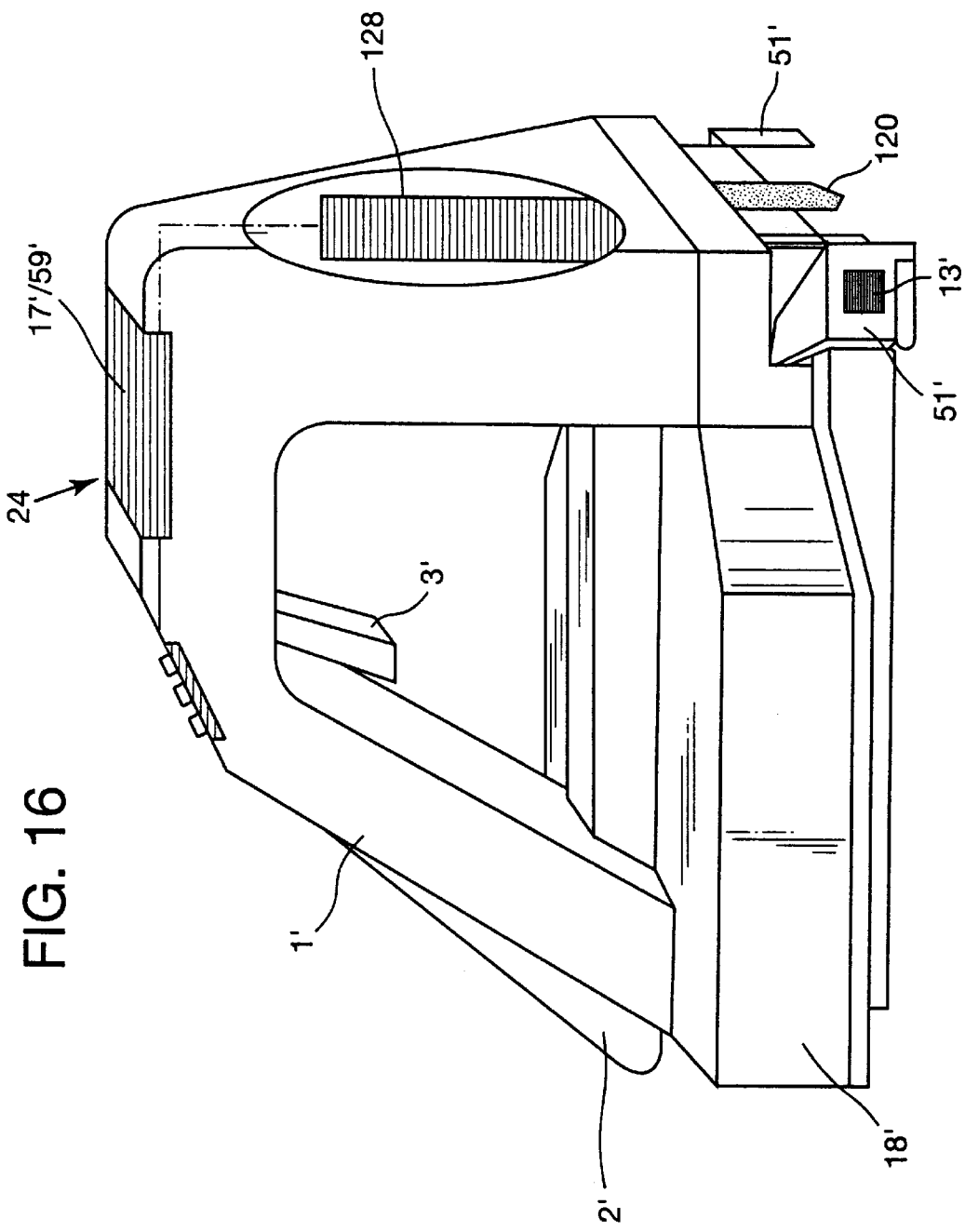

In accordance with FIGS. 12, 15 and 16, the tool 24 can be equipped with operating elements 129 which are integrated into the handle 2 and which, in connection with a computer, not shown, trigger a control function at the tool so that—as described at the outset—the cable conduit 23' is connected.

In accordance with FIG. 16, the individual connecting elements 26 can be connected by means of an adhesive provided in an adhesive tank 128. It is furthermore possible to connect the connecting elements 26 by means of a welding transformer (FIG. 15).

What is claimed is:

1. A device for closing a sheathing, the sheathing having two oppositely located rim parts and closure elements (26) mounted on the two rim parts, wherein the closure elements on one of the rim parts can be connected to, or separated from, the closure elements on the other one of the rim parts, said device comprising:

a tool (24);

a slider (27) carried by said tool (24) and having actuating elements (51, 64) which engage the closure elements (26) to urge the closure elements (26) on each rim part toward or away from the closure elements (26) on the other rim part for connecting and separating the closure elements (26) on one of the rim parts with respect to the closure elements (26) on the other one of the rim parts; and a device (29) for securing closure elements which have been connected together by attaching a fastening element (62) to the two rim parts, the fastening element having two legs and said device (29) being operative for inserting each leg into a respective rim part, said device (29) being provided on said tool (24) and being operable independently of said slider (27), and said device (29) comprising a bending member that is insertable into the sheathing for bending the two legs of the closure element into a securing position after the two legs have been inserted into the respective rim parts.

2. The device in accordance with claim 1, characterized in that the device (29) for securing the connected closure elements (26) is located adjacent to the slider.

3. The device in accordance with claim 2, characterized in that the tool (24) is equipped with several devices (29) for securing clips (62).

4. The device in accordance with claim 1, characterized in that the bending member is constituted by a plunger (54) guided on the tool (24); and a matrix (10).

5. The device in accordance with claim 1, characterized in that the bending member is constituted by a plunger (54) guided on the tool (24) and a matrix, wherein the device (29) is activatable by means of a regulating element (58) which cooperates with a sensor (56) which triggers a regulating pulse after the tool (24) has traveled a defined distance and causes a displacement of the plunger (54).

6. The device in accordance with claim 5, characterized in that the device (29) for securing the connected closure elements (26) is in operative connection with a hydraulic, pneumatic or electric regulating device (21), which is in operative connection with at least one of the regulating element (58) and the plunger (54).

7. The device in accordance with claims 5, characterized in that the device (29) for securing the connected closure elements (26) comprises a hydraulic or pneumatic regulating cylinder (21), which is operatively connected with a trigger device (55) of the plunger (54).

8. The device in accordance with claim 1, further comprising a measuring device (13) associated with the device (29) for securing the connected closure elements (26), which is connectable to with a computer.

9. The device in accordance with claim 5, further comprising a measuring device (13) composed of one of a measuring wheel; and a pulse sensor and the measuring device (13) detects a distance travelled by the tool (24) and, at a defined point, forwards regulating information to a sensor (56), which causes a displacement of the plunger (54).

10. The device in accordance with claim 8, characterized in that the measuring device (13) and the device for securing the connected closure elements (26) are combined in one component.

11. The device in accordance with claim 8, characterized in that the measuring device (13) and the device for securing the connected closure elements (26) are combined in an electrical module.

12. The device in accordance with claim 8, characterized in that the measuring device (13) and the device for securing the connected closure elements (26) are combined in an electrical module, wherein the measuring device (13) and the device for securing the connected closure elements (26) are in operative connection with an electrical control device (59).

13. The device in accordance with claim 1, characterized in that the tool (24) is equipped with a device for registering data supplied via a cable set (61) and is connected with a current supply source (18).

14. The device in accordance with claim 1, characterized in that the tool (24) is equipped with one of an acoustical indicator device, an optical indicator device and a display (17).

15. The device in accordance with claim 1, characterized in that the tool (24) has an unlocking device which is controllable via a sensor (56) and unlocks closure elements, if a branch (106) is to be added to a produced cable bundle (61) or is to be connected with a main cable branch (110).

16. The device in accordance with claim 1, characterized in that the bending member comprises a matrix (10) having opposite ends which are curved.

17. The device in accordance with claim 16, characterized in that the matrix (10) has a thickness, D, and the curvature of the curved ends has a radius of curvature, R, which is half the thickness, D, of the matrix (10).

18. The device in accordance with claim 17, characterized in that the radius R has a value between 1 and 50 mm.

19. A process for closing a cable conduit with the device in accordance with claim 1, comprising first connecting closure elements (26) of the cable conduit with each other by advancing the slider along the closure elements in order cause the actuating elements to engage the closure elements and connect opposing closure elements together, and then securing connected closure elements with each other by attaching the fastening element to the connected closure elements and bending the legs of the fastening element into the securing position, wherein at least one closure element (26) is inserted into the cable conduit in the area of a cable junction (101).

20. A process for closing cable conduits (23) with the device in accordance with claim 1, characterized in that various dimensions of cable conduit arrangements (60) and various branches (105 to 109) or separate bundles (110 to 103) or the distances between two junctions of cable conduit arrangements (60) are stored in a data bank (30) and are supplied to a control device (59) of the tool (24).

21. The device in accordance with claim 1, further comprising a control device (59) which includes a computer (30)

and a data bank storing a control program, the control program being operative for controlling said device (29) for securing the connected closure elements as a function of distance traveled by said tool (24).

22. A process for closing a cable set for an automotive vehicle, the cable set having at least two junctions which are spaced apart by a distance and the cable set being composed of at least one cable conduit having two oppositely located rim parts provided with closure elements, wherein closure elements on one of the rim parts can be connected to closure elements on the other one of the rim parts, said process being carried out with the device in accordance with claim 1 and comprising the steps of:
   a. entering key numbers representative of defined vehicle types into a data bank;
   b. selecting the cable set in accordance with a key number entered into a data bank;
   c. connecting together the rim parts of the at least one cable conduit of the selected cable set by advancing the slider along the rim parts in order cause the actuating elements to engage the closure elements to connect the closure elements on one of the rim parts to the closure elements on the other one of the rim parts; and
   d. operating the device for securing closure elements adjacent one of the at least two junctions in order to secure together the closure elements that have been connected together in step c by attaching a fastening element to the two rim parts of the closure elements that have been fastened together.

23. The process in accordance with claim 22, characterized in that information regarding a cable set (61) for a defined vehicle type stored in the data bank (30) is processed graphically after the entry of a defined numerical characteristic of a car type along with the determination of the individual distances between two junctions, and is made available to production planning (34).

24. The process in accordance with claim 22, wherein said step of operating the device for securing closure elements comprises locking together closure elements that have been connected in step c by bending the legs of the fastening element that was attached in step d into the securing position.

25. The device in accordance with claim 1 wherein said tool is movable in a direction parallel to the rim parts and said slider and said device for securing closure elements are disposed in line with one another along the direction.

* * * * *